United States Patent [19]
Berliner

[11] Patent Number: 5,974,509
[45] Date of Patent: *Oct. 26, 1999

[54] METHOD FOR PURGING UNUSED DATA FROM A CACHE MEMORY

[75] Inventor: Brian Berliner, Colorado Springs, Colo.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/641,523

[22] Filed: May 1, 1996

[51] Int. Cl.⁶ ........................................ G06F 12/00
[52] U.S. Cl. ........................ 711/135; 711/141; 711/118; 711/146
[58] Field of Search ...................... 395/460, 462, 395/463, 473, 449, 667; 711/133, 135, 136, 146, 122

[56] References Cited

U.S. PATENT DOCUMENTS

| | | |
|---|---|---|
| 4,530,055 | 7/1985 | Hamstra et al. ........................ 395/463 |
| 4,835,686 | 5/1989 | Furuya et al. ........................... 395/463 |
| 4,928,239 | 5/1990 | Baum et al. ............................. 395/463 |
| 5,038,278 | 8/1991 | Steely, Jr. et al. ..................... 395/460 |
| 5,125,085 | 6/1992 | Phillips .................................... 395/449 |
| 5,363,496 | 11/1994 | Kato et al. .............................. 395/462 |
| 5,428,757 | 6/1995 | Sulton ..................................... 395/677 |
| 5,542,066 | 7/1996 | Mattson et al. ......................... 395/463 |
| 5,551,003 | 8/1996 | Mattson et al.. ........................ 395/463 |

*Primary Examiner*—Tod R. Swann
*Assistant Examiner*—Fred F. Tzeng
*Attorney, Agent, or Firm*—Stuart T. Langley; William J. Kubida; Holland & Hart LLP

[57] ABSTRACT

An efficient method for purging cache memory sub-blocks within a cache memory block is disclosed. The method is particularly applicable to cache memories established on rotating magnetic media, such as a hard disk drive. The method is unique in that it requires absolutely no system overhead when the system is running and the cache is not completely full. When all sub-blocks within the cache memory have been filled, sophisticated, system resource-intensive algorithms are not employed to determine which is the oldest or the least frequently used sub-block of data. Instead, sub-blocks of data are removed in a pseudo-random manner until ample space is available within the cache.

18 Claims, 2 Drawing Sheets

METHOD FOR PURGING UNUSED DATA FROM A CACHE MEMORY

BACKGROUND OF THE INVENTION

This application is related to U.S. application Ser. No. 08/640,670 filed on Apr. 1, 1996 (Sun patent docket No. P1502); to U.S. application Ser. No. 08/644,643 filed on May 1, 1996 (Sun patent docket No. P1503); to U.S. application Ser. No. 08/644,643 filed on May 1, 1996 (Sun patent docket No. P1504); to U.S. application Ser. No. 08/639,527 filed on May 1, 1996 (Sun patent docket No. P1505); and to U.S. application Ser. No. 08/639,531 filed on May 1, 1996 (Sun patent docket No. P1505), all assigned to Sun Microsystems, Inc., assignee of the present invention, the disclosures of which are herein incorporated by this reference.

1. Field of the Invention

This invention relates to non-volatile caching systems for data processing systems, and methods for implementing such systems.

2. Description of Related Art

Caching has long been employed to increase performance of a relatively slow computer memory resource when a faster memory resource, which typically has a higher cost per stored bit, is available. Typically, a temporary memory block within the faster memory resource (i.e., a cache) is established for storing only a portion of the information stored within the slower memory resource. Rather than store within the faster memory resource an entire application program or an entire data file that may be resident on the slower memory resource, certain algorithms are employed to determine which portions of the program or data file are most likely to be accessed. When the system's central processing unit (CPU) calls a memory location that is not stored in the cache, the cache (if completely filled) must be at least partially overwritten with the required data from the slower memory resource. Likewise, when permanent changes are made to data, data in both the cache and the slower memory resource must be updated to reflect that change.

As this is written, there are roughly 150 million computers throughout the world capable of performing general business-related tasks. When the rapid proliferation of personal computers began in the early 1980s, nearly all of them were employed as stand-alone units. However, multi-user systems were soon developed. These early multi-user systems ran software written for the CP/M disk operating system, which had been written by Gary Kildall and was marketed by his company, Digital Research, Inc. The multi-user disk operating system MP/M supplied by Digital Research, Inc. connected several "dumb" terminals to a single microprocessor and a shared disk drive, while TurboDOS—a much more sophisticated product supplied by an unrelated company—utilized a master/slave arrangement much like the Local Area Networks (LANs) in use today.

Both the MP/M and the TurboDOS disk operating systems ran on computer systems based on either the Intel 8080 microprocessor or the Zilog Z-80 microprocessor. Neither of these early microprocessors could directly address more than 65,536 bytes of random-access memory. As a consequence of MP/M and TurboDOS requiring a minimum of about 50,000 bytes of random access memory, only about 15,000 bytes of addressable memory remained for application programs. As few application programs, other than simple word processors, required 15,000 bytes or less, the early multi-user systems were, for the most part, more intellectual curiosities than they were practical, general-use, multi-user data processing systems.

Distributed data processing (i.e., multiple LANs interconnected via a long-distance data link) using either MP/M or TurboDOS was even more hopeless, as it would have required loading a communication program into memory, in addition to the operating system, before application software could be loaded. However, with the introduction of IBM-compatible computers based on the Intel 80286 microprocessor, which was designed to address several megabytes of random-access memory, the development of practical LANs and distributed data processing systems became feasible. Although Novel Corporation initially captured a majority share of the LAN market, the number of networks utilizing LAN software from Microsoft Corp. has been growing.

Present-day LANs generally use a twisted wire pair or a coaxial cable to interconnect individual user computer systems to a server system. Fiber optics the interconnection of LANs is accomplished via telephone lines, special dedicated data lines, microwave, or satellite links. For acoustic links, each end of the link generally requires a modem. The other links typically utilize a "bridge" and a "router" at each end.

Distributed data processing networks and the LANs within those distributed networks can often benefit from caching. Typically, links between LANs of a distributed processing network are slower than the interconnections between the nodes (i.e., individual computers) of a LAN. Furthermore, though a distant memory resource (e.g. a disk drive on a distant server system) may be as fast or even faster than local memory resources, long distance interconnections over a data link can dramatically slow access time to that distant resource. Regardless of the type of link between the LANs of a distributed processing network, or between the nodes (i.e., individual systems) of a LAN, each data link has a given bandwidth which will permit only a finite amount of data to be simultaneously transferred over the link. Once the bandwidth is exceeded, as for example when more than a certain number of users are attempting to communicate over the same link (whether between LANs or within a LAN), response time over that link typically degrades as each user's request is delayed in order to evenly accommodate all competing requests. Consequently, caching of data read over a network can generally increase system performance both by reducing data link loading and by providing the end user with a cache of rapidly accessible data.

Within the last several years, compact disc read-only-memory devices (CD-ROMs) have become extremely popular due to the availability of lowcost, high-capacity compact disk storage media and relatively low cost CD-ROM readers (drives). In fact, nearly all new personal computers being sold in the U.S. include an installed CD-ROM drive. Although current CD-ROM media are capable of storing approximately 450–500 megabytes of data, access to that data is considerably slower than data stored on a modern hard disk drive. For example, the current standard for a high-performance CD-ROM drive, known as a "6X" drive is capable of reading, at most, about 600 kilobytes of data per second. A modern high-speed IDE hard disk drive, on the other hand, is capable of reading about six megabytes per second—roughly ten times the speed of a 6X CD-ROM drive. Thus, CD-ROM drive performance may also be greatly enhanced through caching.

Many graphical user interface (GUI) environments, such as Microsoft® Windows™ ver. 3.X, Microsoft Windows 95, Windows NT®, IBM Corporation's OS/2®, and Geoworks® have been developed over the years. Of the aforementioned products, only Windows NT and OS/2 are true operating systems, as Geoworks and Windows 3.x must be loaded and run under the venerable Microsoft MS-DOS operating system. Windows 95 is somewhat of a hybrid, as it also requires portions of MS-DOS for its operation. For the sake of simplicity, though, both Windows 3.X and Windows 95 are referred to hereinafter as operating systems.

As this is written, Microsoft Windows ver. 3.X is far and away the most used operating system, having been bundled with nearly every personal computer sold between 1989 and mid-1995. However, from the date of its release in 1995, the Microsoft Windows 95 operating system from Microsoft Corporation has been bundled with most new, high-performance personal computers. In less than a year, it has become the operating system of choice for most business applications, and is expected to rapidly supplant Windows 3.X as the most used operating system for personal computers. The potential exists for significantly increasing the performance of both CD-ROM drives and distributed processing networks operating under Windows 3.x and Windows 95 operating systems through caching.

SUMMARY OF THE INVENTION

Shortly after the release of Windows 95, Sun Microsystems, Inc. (hereinafter also "Sun") set about to create a network and CD-ROM caching product that runs under both Windows 3.X and Windows 95, is completely transparent to end-users, and works with a wide variety of file systems running under both Windows 3.X and Windows 95. In order to fulfill these requirements in its recently released caching product, Sun utilizes the services provided by the Installable File System Manager (IFSMGR) virtual device driver. This process is fully explained in related patent application Ser. No. 08/641,654 (Sun docket number P1503), incorporated herein by reference. Briefly, the IFSMGR driver—through a "hooking" process—permits the caching product to view all file system input/output (I/O) requests and to take interim control of the I/O operation. Thus, the new caching product is effectively "layered" between the IFSMGR driver and the generic file system of Windows 95. The caching product also fits the definition of a virtual device driver.

Sun's new caching product, which has been named "Solstice PC-CacheFS" (hereinafter "PC-CacheFS"), employs a block of readable, writable and erasable memory resident on rotating, magnetic-media (e.g., a hard-disk drive). As a performance enhancement, it may also employ a block of readable, writable and erasable memory in the random access memory (RAM). Each block of user-configurable cache memory—whether on rotating magnetic media or in RAM—is made up of a fixed quantity of cache memory sub-blocks.

When a system call for data from a distant network memory resource (e.g., a hard disk drive or CD-ROM connected to a server) or a local CD-ROM is made, an amount of data equivalent in size to a cache memory sub-block, which includes the data actually called for by the system, is read from the distant memory resource or local CD-ROM and written to a sub-block location within the cache memory. When data called for by the system has not been loaded into one of the sub-blocks within the cache, a miss is registered by the caching product. A miss requires a further access of the resource being cached and the writing of another sub-block-sized quantity of data to the cache memory block.

At some point, all sub-blocks within the cache will have been loaded and no additional space within the cache memory block remains for the writing of additional sub-blocks of data. Thus, at least one of the sub-blocks of data within the cache memory block must be purged to make room for a sub-block containing data called for by the system. This process of purging sub-blocks from the cache memory block is often called "garbage collecting", although it is more akin to garbage burning, as the purged data then exists only within the distant memory resource or local CD-ROM that is being cached.

The purging of sub-blocks with a cache memory is typically performed using an algorithm which determines a ranking for sub-blocks within the cache on the basis of either time since last use or frequency of use. Because caching is normally accomplished with semiconductor memory, housekeeping tasks such as the purging of cache sub-blocks can proceed rapidly. However, PC-CacheFS implements caching primarily on rotating magnetic media. As the access time for fastest modern hard disk drives is typically about three orders of magnitude slower than the fastest semiconductor memory, the overhead required to maintain data tables for enabling either a least-recently-used (LRU) or a least-frequently-used (LFU) purging algorithm would slow the caching operation considerably, even when sub-blocks within the cache memory are not being purged. The user would notice an even greater degradation in system performance at purging time. In order to avoid significant reductions in system performance related both to overhead required for the implementation of LRU, LFU, and other similar algorithms and the purging operation itself, a new technique has been developed for use with Sun's PC-CacheFS caching product.

This invention includes an efficient method for purging cache memory sub-blocks within a cache memory block. The method is particularly applicable to cache memories established on rotating magnetic media. The method is unique in that it requires absolutely no system overhead when the system is running and the cache is not completely full. When all sub-blocks within the cache memory have been filled, sophisticated, system resource-intensive algorithms are not employed to determine which is the oldest or the least frequently used sub-block of data. Instead, sub-blocks of data are removed in a pseudo-random manner until ample space is available within the cache.

DETAILED DESCRIPTION OF PREFERRED EMBODIMENTS

The embodiments of the invention described herein may be implemented as logical operations in a distributed processing system having client and server computing systems. The logical operations of the present invention are implemented (1) as a sequence of computer implemented steps running on the computing system and (2) as interconnected machine modules within the computing system. The implementation is a matter of choice that is dependent on the performance requirements of the computing system implementing the invention. Accordingly, the logical operations making up the embodiments of the invention described herein are referred to variously as operations, steps or modules.

Figure 1:
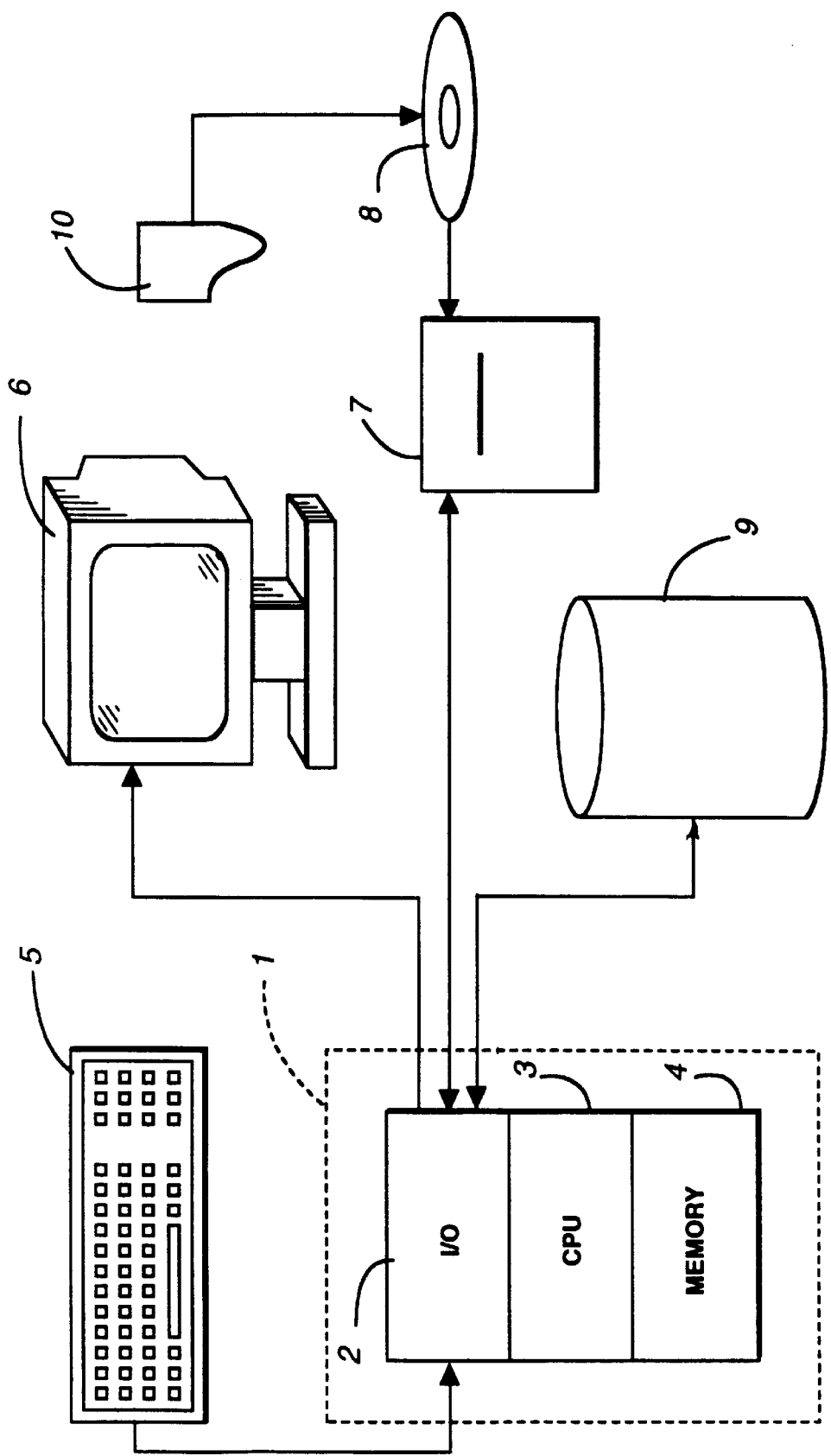
FIG. 1 illustrates a computing system for performing the computer implemented steps of the method in accordance with the invention.

The operating environment in which the present invention is used encompasses the general distributed computing system, wherein general purpose computers, workstations, or personal computers (hereinafter local nodes) are connected via communication links of various types, in a client-server arrangement, wherein programs and data, many in the form of objects, are made available by various members of the system. Some of the elements of a general purpose workstation computer are shown in FIG. 1, wherein a processor 1 is shown, the processor having an input/output (I/O) section, a central processing unit (CPU) 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. The computer program products containing mechanisms to effectuate the apparatus and methods of the present invention may reside in the memory section 4, or on a disk storage unit 9, or on the CD-ROM 8 of such a system. Examples of such systems include SPARC systems offered by Sun Microsystems, Inc., personal computers offered by IBM Corporation and by other manufacturers of IBM-compatible personal computers, and systems running the UNIX operating system.

The new method for purging no longer used sub-blocks of data within a cache memory to make room new sub-blocks containing data required by the system is particularly applicable to cache memories established on rotating magnetic media such as hard disk drives. The method is unique in that it requires absolutely no system overhead when the system is running and the cache is not completely full. No system overhead is required because the new purging method does not utilize a purging algorithm which requires the caching program to maintain tables for keeping track of sub-blocks on the basis of recentness or frequency of use. When all sub-blocks within the cache memory have been filled, sub-blocks of data are removed in a pseudo-random manner until ample space is available within the cache.

Figure 2:
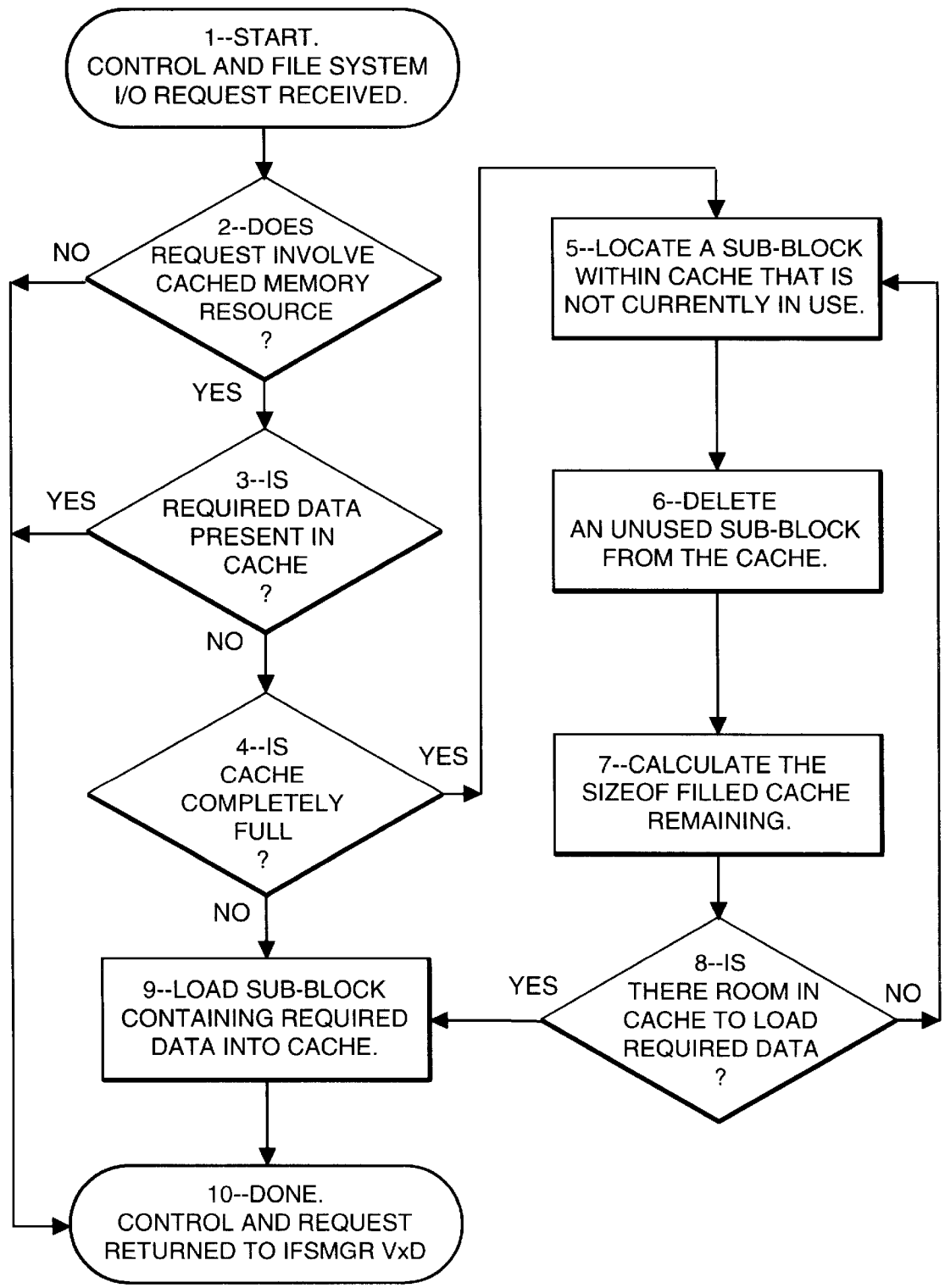
FIG. 2 is a flow chart depicting the steps utilized to implement the preferred embodiment of the cache purging method.

The pseudo-code flow chart of FIG. 2 illustrates the steps taken to implement a preferred embodiment of the new cache purging method. The purging method works in conjunction with the servicing of file I/O requests received by the caching program from the IFSMGR virtual device driver. The purging logic functions as follows:

(1) the caching virtual device driver is "hooked" by the IFSMGR virtual device driver and handed a file system I/O request.

(2) does the received file request involve data resident on a system memory resource which is to be cached?
Yes: Goto Step (10).
No: Goto Step (3).

(3) Is the data which satisfies the request present in a sub-block loaded in the cache?
Yes: Goto Step (10).
No: Goto Step (4).

(4) Is the cache completely full?
Yes: Goto step (5).
No: Goto Step (9).

(5) Scan the hierarchical structure of cached sub-blocks without regard to age or frequency of use in order to locate a sub-block that is not currently being accessed by an application.

(6) Delete an unused sub-block from the cache.

(7) Calculate the size of the cache remaining.

(8) Does enough free space now exist in the cache to load the required data?
Yes: Goto Step (9).
No: Goto Step (5).

(9) Load a sub-block containing required data into the cache.

(10) Control returned to IFSMGR virtual device driver.

It should be noted that if identically-sized sub-blocks of data are always loaded into the cache, the flow scheme may be simplified by eliminating steps (7) and (8), as once a sub-block is erased, a new sub-block will always fit in the cache. An unused sub-block within the cache would simply be overwritten by a sub-block containing the data called for by the incoming file system I/O request.

While the invention has been particularly shown and described with reference to a preferred embodiment thereof, it will be understood by those skilled in the art that various other changes in the form and details may be made therein without departing from the spirit and scope of the invention.

What is claimed is:

1. A method for purging data sub-blocks from a cache memory in response to a request to load data in to the cache memory comprising the steps of:

providing for determining memory space required by the request to load;

providing for identifying in a pseudo-random manner at least one of the sub-blocks loaded within the cache memory which is not being accessed by an application program undergoing execution by said data processing system;

providing for deleting the identified sub-block from the cache memory to create free cache space; and providing for repeating the identifying and deleting until the free cache space is at least as large as the memory space required by the request to load.

2. The method of claim 1 wherein said step of providing for identifying at least one of the existing sub-blocks of data is performed without regard to age of said at least one of said sub-blocks of data.

3. The method of claim 1 wherein said step of providing for identifying at least one of the existing sub-blocks of data is performed without regard to frequency of use of said at least one of said sub-blocks of data.

4. The method of claim 1 wherein said step of providing for identifying at least one of the existing sub-blocks of data is performed without regard to time of last use of said at least one of said sub-blocks of data.

5. A method for purging data sub-blocks from a cache memory in response to a request to load data in to the cache memory comprising the steps of:

determining memory space required by the request to load;

identifying in a pseudo-random manner at least one of the sub-blocks loaded within the cache memory which is not being accessed by an application program undergoing execution by said data processing system;

deleting the identified sub-block from the cache memory block to create free cache space; and repeating the identifying and deleting until the free cache space is at least as large as the memory space required by the request to load.

6. The method of claim 5 wherein said step of identifying at least one of the existing sub-blocks of data is performed without regard to age of said at least one of said sub-blocks of data.

7. The method of claim 5 wherein said step of identifying at least one of the existing sub-blocks of data is performed without regard to frequency of use of said at least one of said sub-blocks of data.

8. The method of claim 5 wherein said step of identifying at least one of the existing sub-blocks of data is performed without regard to time of last use of said at least one of said sub-blocks of data.

9. A method for purging sub-blocks from a cache memory said method being encoded in the form of binary program instructions embedded in a caching virtual device driver executable on a data processing system, said method comprising the steps of:

provrding for receiving a file system input/output request for data resident on a memory resource;

providing for determining whether the memory resource has been selected for caching;

providing for ignoring the request if the memory resource has not been selected for caching;

providing for determining whether the cache memory contains the requested data if the resource has been selected for caching;

providing for determining whether an amount of free space in the cache memory is less than an amount of memory space required by the file system input/output request;

providing for accessing the memory resource and loading a data sub-block containing the requested data into the cache memory block if the free space is greater than the memory space required by the input/output request;

providing for identifying in a pseudo-random manner a data sub-block occupying space within the cache memory that is not currently being used by a running application program if the free space is less than the memory space required by the input/output request;

providing for repeating the identifying until the free space combined with the space occupied by the identified sub-blocks is at least as great as the memory space required by the input/output request;

providing for loading a data sub-block containing the requested data into a region within the cache memory occupied by the identified data sub-block; and providing for delivering the requested data to the file system.

10. The method of claim 9, which further comprises the step of providing for deleting from the cache memory block the identified data sub-block prior to loading the data sub-block containing the requested data.

11. The method of claim 9, wherein the identified sub-block is overwritten with the data sub-block containing the requested data.

12. A computer program product comprising a computer usable medium having a computer readable code embodied therein for purging data sub-blocks from a cache memory the computer program product comprising:

computer readable program code devices configured to cause a computer to effect providing for identifying in a pseudo-random manner at least one of the sub-blocks of data loaded within the cache memory which is not being accessed by an application program undergoing execution by said data processing system; and computer readable program code devices configured to cause a computer to effect providing for deleting the identified sub-block from the cache memory block.

13. The computer program product of claim 12 wherein said computer readable program code devices configured to cause a computer to effect providing for identifying at least one of the existing sub-blocks of data comprises computer readable program code devices configured to cause a computer to effect providing for identifying at least one of the existing sub-blocks of data without regard to age of said at least one of the existing sub-blocks.

14. The computer program product of claim 12 wherein said computer readable program code devices configured to cause a computer to effect providing for identifying at least one of the existing sub-blocks of data comprises computer readable program code devices configured to cause a computer to effect providing for identifying at least one of the existing sub-blocks of data without regard to frequency of use of said at least one of the existing sub-blocks.

15. The computer program product of claim 12 wherein said computer readable program code devices configured to cause a computer to effect providing for identifying at least one of the existing sub-blocks of data comprises computer readable program code devices configured to cause a computer to effect providing for identifying at least one of the existing sub-blocks of data without regard to time of last use of said at least one of the existing sub-blocks.

16. A computer program product comprising a computer usable medium having a computer readable code embodied therein for purging data sub-blocks from a cache memory of fixed size which can be loaded with a plurality of data sub-blocks, the computer program product comprising:

computer readable program code devices configured to cause a computer to effect providing for receiving a file system input/output request for data resident on a memory resource;

computer readable program code devices configured to cause a computer to effect providing for determining whether or not the memory resource has been selected for caching;

computer readable program code devices configured to cause a computer to effect providing for ignoring the request if the memory resource has not been selected for caching or, alternatively, providing for determining whether or not the cache memory contains the requested data if the resource has been selected for caching;

computer readable program code devices configured to cause a computer to effect providing for determining whether or not the cache memory is completely full;

computer readable program code devices configured to cause a computer to effect providing for accessing the memory resource and loading a data sub-block containing the requested data into the cache memory if the cache memory block is not completely full;

computer readable program code devices configured to cause a computer to effect providing for identifying in a pseudo-random manner a data sub-block within the cache memory block that is not currently being used by a running application program if the cache memory is completely full;

computer readable program code devices configured to cause a computer to effect providing for loading a data sub-block containing the requested data into a region within the cache memory block occupied by the identified data sub-block; and computer readable program code devices configured to cause a computer to effect providing for delivering the requested data to the file system.

17. The computer program product of claim 16, which further comprises computer readable program code devices configured to cause a computer to effect providing for deleting from the cache memory block the identified data sub-block prior to loading the data sub-block containing the requested data.

18. The computer program product of claim 16, which further comprises computer readable program code devices configured to cause a computer to effect providing for overwriting the identified sub-block with the data sub-block containing the requested data.

* * * * *